United States Patent
Ye et al.

(10) Patent No.: US 11,295,064 B2
(45) Date of Patent: Apr. 5, 2022

(54) METHOD FOR TRANSMITTING INFORMATION AT USER DEVICE SIDE AND NETWORK DEVICE SIDE

(71) Applicant: SHANGHAI ZHANGMEN SCIENCE AND TECHNOLOGY CO., LTD., Shanghai (CN)

(72) Inventors: ZhaoXiong Ye, Shanghai (CN); YuJie Qian, Shanghai (CN); JinXian Qin, Shanghai (CN)

(73) Assignee: SHANGHAI ZHANGMEN SCIENCE AND TECHNOLOGY CO., LTD., Shanghai (CN)

( * ) Notice: Subject to any disclaimer, the term of this patent is extended or adjusted under 35 U.S.C. 154(b) by 12 days.

(21) Appl. No.: 16/541,196

(22) Filed: Aug. 15, 2019

(65) Prior Publication Data
US 2019/0370314 A1    Dec. 5, 2019

Related U.S. Application Data

(63) Continuation of application No. PCT/CN2017/113461, filed on Nov. 29, 2017.

(30) Foreign Application Priority Data

Feb. 15, 2017 (CN) .......................... 201710081882.2

(51) Int. Cl.
*G06F 40/109* (2020.01)
*G06F 3/023* (2006.01)
(Continued)

(52) U.S. Cl.
CPC .......... *G06F 40/109* (2020.01); *G06F 3/0233* (2013.01); *H04L 51/04* (2013.01)

(58) Field of Classification Search
CPC ....... G06F 40/109; G06F 3/0233; H04L 51/04
(Continued)

(56) References Cited

U.S. PATENT DOCUMENTS

| 6,256,650 | B1 * | 7/2001 | Cedar | ..................... G06F 40/10 715/235 |
|---|---|---|---|---|
| 10,080,113 | B1 * | 9/2018 | Guan | ..................... H04L 51/066 |

(Continued)

FOREIGN PATENT DOCUMENTS

| CN | 1913499 A | 2/2007 |
|---|---|---|
| CN | 102279708 A | 12/2011 |

(Continued)

*Primary Examiner* — Stephen S Hong
*Assistant Examiner* — Broderick C Anderson
(74) *Attorney, Agent, or Firm* — Bayramoglu Law Offices LLC

(57) ABSTRACT

A method, device and system for transmitting information. A first user device acquires input information of a first user in an input box, displays information in a current input line in a corresponding biggest available font on the basis that a total display width of the information in the current input line is less than or equal to a line display width of the input box, and sends, when acquiring an information sending operation of the first user, the information in the input box to a second user device via a network device, and the second user device receives and displays the information in the input box. A layout operation is performed in the corresponding biggest available font on the basis that the total display width of the information in the current input line is less than or equal to the line display width of the input box.

8 Claims, 3 Drawing Sheets

(51) Int. Cl.
*H04L 12/58* (2006.01)
*H04L 51/04* (2022.01)

(58) Field of Classification Search
USPC .......................................... 715/269
See application file for complete search history.

(56) References Cited

U.S. PATENT DOCUMENTS

2006/0112333 A1* 5/2006 Iwanaga ............... G06F 40/109
715/246
2011/0055440 A1* 3/2011 Sakai .................... G06F 40/169
710/58
2017/0103046 A1* 4/2017 Schroder .............. G06K 9/6828

FOREIGN PATENT DOCUMENTS

| CN | 105607800 A | | 5/2016 | |
|---|---|---|---|---|
| CN | 105607804 A | | 5/2016 | |
| CN | 106878151 A | | 6/2017 | |
| EP | 1548609 A1 | | 6/2005 | |
| JP | H05120280 A | * | 10/1991 | ............. G06F 17/21 |
| JP | 04252327 A | * | 9/1992 | |

* cited by examiner

METHOD FOR TRANSMITTING INFORMATION AT USER DEVICE SIDE AND NETWORK DEVICE SIDE

CROSS REFERENCE TO THE RELATED APPLICATIONS

This is a continuation application of International Application PCT/CN2017/113461, with an international filing date of Nov. 29, 2017, which claims priority to Chinese Patent Application No. 201710081882.2 filed on Feb. 15, 2017, the entire contents of which are incorporated herein by reference.

TECHNICAL FIELD

The present application relates to the field of communications, and in particular, to a technology for transmitting information.

BACKGROUND

With the development of communication technologies, people are increasingly accustomed to using instant messaging software to communicate with other persons. However, in the prior art, text information sent in a dialogue box of the instant messaging software is not typeset, has a same font size, and cannot be sent to the other person in a form of a picture, which results in less readability, less enjoyment, and lack of a typographic diversity.

SUMMARY

The present application is intended to provide a method, a device, and a system for transmitting information.

According to one aspect of the present application, a method for transmitting information at a first user device side is provided, the method including:

acquiring input information of a first user in an input box;

displaying information in a current input line in a corresponding biggest available font, a total display width of the information in the current input line being less than or equal to a line display width of the input box; and sending, when acquiring an information sending operation of the first user, information in the input box to a corresponding receiver via a network device.

According to another aspect of the present application, a method for transmitting information at a network device side is provided, the method including:

receiving information in an input box sent by a first user device; and sending the information in the input box to a corresponding receiver.

According to still another aspect of the present application, a method for transmitting information at a second user device side is provided, the method including:

receiving information in an input box sent by a network device; and displaying the information in the input box.

According to yet another aspect of the present application, an input method is provided, including:

acquiring input information of a user in an input box; and displaying information in a current input line in a corresponding biggest available font, a total display width of the information in the current input line being less than or equal to a line display width of the input box.

According to still another aspect of the present application, a first user device for transmitting information is provided, the first user device including:

a first apparatus, configured to acquire input information of a first user in an input box;

a second apparatus, configured to display information in a current input line in a corresponding biggest available font, a total display width of the information in the current input line being less than or equal to a line display width of the input box; and a third apparatus, configured to send, when acquiring an information sending operation of the first user, information in the input box to a corresponding receiver via a network device.

According to still another aspect of the present application, a network device for transmitting information is provided, the network device including:

a sixth apparatus, configured to receive information in an input box sent by a first user device; and a seventh apparatus, configured to send the information in the input box to a corresponding receiver.

According to still another aspect of the present application, a second user device for transmitting information is provided, the second user device including:

an eighth apparatus, configured to receive information in an input box sent by a network device; and a ninth apparatus, configured to display information in the input box.

According to still another aspect of the present application, an input device is provided, including:

an acquiring apparatus, configured to acquire input information of a user in an input box; and a display apparatus, configured to display information in a current input line in a corresponding biggest available font, a total display width of the information in the current input line being less than or equal to a line display width of the input box.

According to still another aspect of the present application, a system for transmitting information is provided, the system including the foregoing first user device, the foregoing network device, and the foregoing second user device.

According to still another aspect of the present application, a method for transmitting information is provided, the method including:

acquiring, by a first user device, input information of a first user in an input box;

displaying, by the first user device, information in a current input line in a corresponding biggest available font, a total display width of the information in the current input line being less than or equal to a line display width of the input box;

sending, by the first user device when acquiring an information sending operation of the first user, information in the input box to a network device;

receiving, by the network device, the information in the input box sent by the first user device;

sending, by the network device, the information in the input box to a corresponding second user device;

receiving, by the second user device, the information in the input box sent by the network device; and displaying, by the second user device, the information in the input box.

According to still another aspect of the present application, a method for transmitting information is provided, the method including:

acquiring, by a first user device, input information of a first user in an input box;

displaying, by the first user device, information in a current input line in a corresponding biggest available font, a total display width of the information in the current input line being less than or equal to a line display width of the input box;

generating, by the first user device when acquiring an information sending operation of the first user, corresponding picture information according to the information in the input box and the biggest available font of each line, and sending the picture information to a network device;

receiving, by the network device, the picture information sent by the first user device, and sending the picture information to a corresponding second user device; and receiving, by the second user device, the picture information sent by the network device, and displaying the picture information.

According to still another aspect of the present application, a method for transmitting information is provided, the method including:

acquiring, by a first user device, input information of a first user in an input box;

displaying, by the first user device, information in a current input line in a corresponding biggest available font, a total display width of the information in the current input line being less than or equal to a line display width of the input box;

sending, by the first user device when acquiring an information sending operation of the first user, information in the input box and a biggest available font of each line to a network device;

receiving, by the network device, the information in the input box and the biggest available font of each line sent by the first user device;

generating, by the user device, corresponding picture information according to the information in the input box and the biggest available font of each line, and sending the picture information to a corresponding second network device; and receiving, by the second user device, the picture information sent by the network device, and displaying the picture information.

According to still another aspect of the present application, a method for transmitting information is provided, the method including:

acquiring, by a first user device, input information of a first user in an input box;

displaying, by the first user device, information in a current input line in a corresponding biggest available font, a total display width of the information in the current input line being less than or equal to a line display width of the input box;

sending, by the first user device when acquiring an information sending operation of the first user, information in the input box and a biggest available font of each line to a network device;

receiving, by the network device, the information in the input box and a biggest available font of each line sent by the first user device, and sending the information in the input box and the biggest available font of each line to a corresponding second user device;

receiving, by the second network device, the information in the input box and the biggest available font of each line sent by the network device; and generating, by the second user device, corresponding picture information according to the information in the input box and the biggest available font of each line, and displaying the picture information.

According to still another aspect of the present application, there is provided a computer readable storage medium including instructions which, when executed, cause a system to perform the following operations:

acquiring input information of a first user in an input box;

displaying information in a current input line in a corresponding biggest available font, a total display width of the information in the current input line being less than or equal to a line display width of the input box; and sending, when acquiring an information sending operation of the first user, information in the input box to a corresponding receiver via a network device.

According to still another aspect of the present application, there is provided a computer readable storage medium including instructions which, when executed, cause a system to perform the following operations:

receiving information in an input box sent by a first user device; and sending the information in the input box to a corresponding receiver.

According to still another aspect of the present application, there is provided a computer readable storage medium including instructions which, when executed, cause a system to perform the following operations:

receiving information in an input box sent by a network device; and displaying the information in the input box.

According to still another aspect of the present application, a first user device for transmitting information is provided, the first user device including:

a processor; and a memory configured to store computer executable instructions which, when executed, cause the processor to:

acquire input information of a first user in an input box;

display information in a current input line in a corresponding biggest available font, a total display width of the information in the current input line being less than or equal to a line display width of the input box; and send, when acquiring an information sending operation of the first user, information in the input box to a corresponding receiver via a network device.

According to still another aspect of the present application, a network device for transmitting information is provided, the network device including:

a processor; and a memory configured to store computer executable instructions which, when executed, cause the processor to:

receive information in an input box sent by a first user device; and send the information in the input box to a corresponding receiver.

According to still another aspect of the present application, a second user device for transmitting information is provided, the second user device including:

a processor; and a memory configured to store computer executable instructions which, when executed, cause the processor to:

receive information in an input box sent by a network device; and display the information in the input box.

In comparison to the prior art, a first user device of the present application acquires input information of a first user in an input box, displays information in a current input line in a corresponding biggest available font on the basis that a total display width of the information in the current input line is less than or equal to a line display width of the input box, and sends, when acquiring an information sending operation of the first user, the information in the input box to a network device. The network device receives the information in the input box sent by the first user device and sends the information in the input box to a corresponding second user device, and the second user device receives the information in the input box sent by the network device and displays the information in the input box. In the present application, a layout operation is performed in the corresponding biggest available font on the basis that the total display width of the information in the current input line is less than or equal to the line display width of the input box. The input box is a preview box, which is available for real-time preview by the first user, providing a user-friendly chat interface, increasing enjoyment of user chat, and optimizing user experience.

Further, the present application provides a plurality of manners for generating the information in the input box and picture information corresponding to a biggest available font of each line. For example, a first user device may generate the picture information, and then sends the picture information to a second user device via a network device. In such manner, a client of a low version may be compatible. Alternatively, a second user device may generate corresponding picture information according to the received information in the input box and the biggest available font of each line. In such manner, user traffic may be saved and the generated picture information is more suitable for view on the second user device. In addition, the network device may generate corresponding picture information according to the information in the input box and the biggest available font of each line sent by the first user device, and then sends the picture information to the second user device.

BRIEF DESCRIPTION OF THE DRAWINGS

Other features, objectives, and advantages of the present application will become more obvious by reading the detailed description of non-limitative embodiments that is provided with reference to the following accompanying drawings.

Same or similar reference numerals indicate same or similar components in the accompanying drawings.

DETAILED DESCRIPTION OF THE EMBODIMENTS

The present application is further described below in detail with reference to the accompanying drawings.

In a typical configuration of the present application, a terminal, a device of a service network, and a trusted party all include one or more processors (CPUs), an input/output interface, a network interface, and a memory.

The memory may include a form such as a persistent memory, a random-access memory (RAM) and/or a non-volatile memory of computer readable media, for example, a read-only memory (ROM) or a flash memory (RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of a storage medium of a computer include, but are not limited to, a phase-change memory (PRAM), a static random-access memory (SRAM), a dynamic random-access memory (DRAM), a RAM of another type, a ROM, an electrically erasable programmable read-only memory (EEPROM), a flash memory or another memory technology, a compact disc read-only memory (CD-ROM), a digital versatile disc (DVD) or another optical storage device, a cassette tape, disk and tape memory or another magnetic storage device, or any other non-transmission media, which may be configured to store information that can be accessed by a computing device. According to limitations of this specification, the computer readable medium does not include a non-transitory computer readable medium (transitory media), such as a modulated data signal and a modulated carrier.

Figure 1:
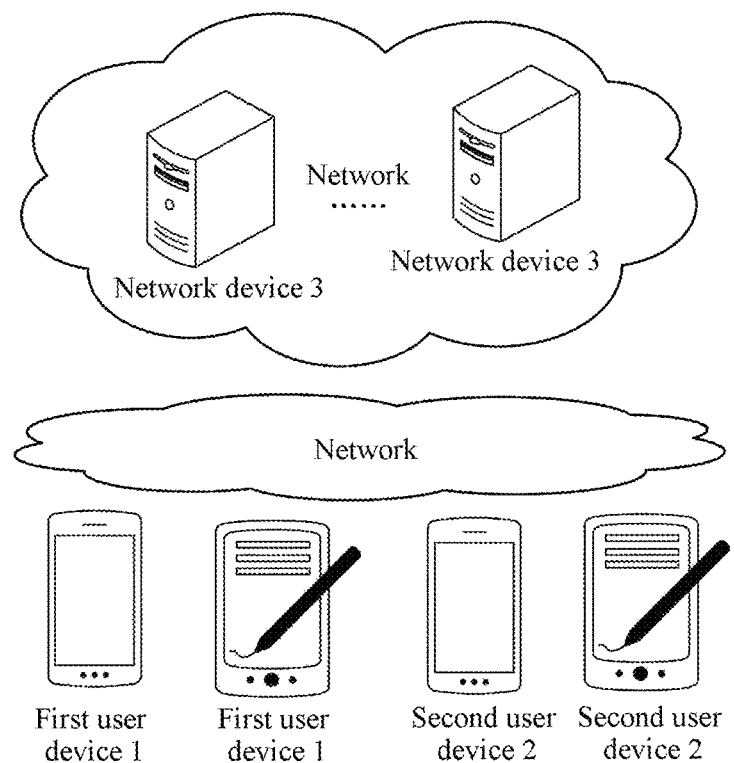
FIG. 1 is a topology diagram of a system for transmitting information according to an embodiment of the present application.

FIG. 1 is a topology diagram of a system for transmitting information according to an embodiment of the present application, the system including a first user device 1, a second user device 2, and a network device 3.

Herein, the network device 3 includes an instruction that can be preset or stored in advance, and an electronic device for automatically performing numerical computation and information processing, hardware thereof including but not limited to a microprocessor, an application-specific integrated circuit (ASIC), a programmable gate array (FPGA), a digital processor (DSP), and an embedded device, etc. The network device 3 includes, but is not limited to, a computer, a network host, a single network server, a plurality of network server sets, or cloud composed of a plurality of servers. The cloud consists of a large number of computers or network servers based on cloud computing, the cloud computing being one of distributed computing, a virtual supercomputer composed of a group of loosely coupled computers. The network includes, but is not limited to, the Internet, a wide area network, a metropolitan area network, a local area network, a VPN network, a wireless ad hoc network (AdHoc network), and the like. The first user device 1, the second user device 2 include, but are not limited to, any mobile electronic product that may perform human-computer interaction with a user, such as a smart phone, a tablet computer, and a notebook computer, etc. The mobile electronic product may use any operating system, such as an android operating system, an iOS operating system, or a Windows operating system, etc.

For brevity, a system composed of the network device 3, one first user device 1, and one second user device 2 is used as an example for description below.

Figure 2:
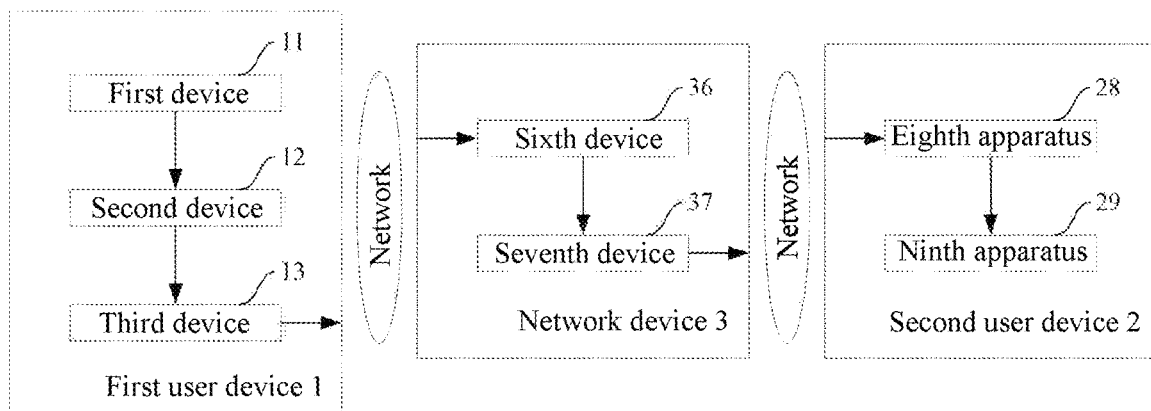
FIG. 2 is schematic diagrams of a first user device, a network device, and a second user device for transmitting information according to another embodiment of the present application.

FIG. 2 shows a first user device 1, a network device 3, and a second user device 2 for transmitting information according to another embodiment of the present application. The first user device 1 includes a first apparatus 11, a second apparatus 12, and a third apparatus 13. The network device 3 includes a sixth apparatus 36 and a seventh apparatus 37. The second user device 2 includes an eighth apparatus 28 and a ninth apparatus 29.

Specifically, the first apparatus 11 acquires input information of a first user in an input box; the second apparatus 12 displays information in a current input line in a corresponding biggest available font, wherein a total display width of the information in the current input line is less than or equal to a line display width of the input box; and the third apparatus 13 sends the information in the input box to a corresponding receiver via the network device 3 when acquiring an information sending operation of the first user. The sixth apparatus 36 receives the information in the input box sent by the first user device 1; and the seventh apparatus 37 sends the information in the input box to the corresponding receiver. The eighth apparatus 28 receives the information in the input box sent by the network device 3; and the ninth apparatus 29 displays the information in the input box.

Herein, the first user device 1 is a sender of information, and the second user device 2 is a receiver of information. The network device 3 transits and transmits information between the first user device 1 and the second user device 2.

Figure 3:
FIG. 3 is a schematic diagram of an input box of a first user device according to yet another embodiment of the present application.

For example, referring to FIG. 3, as a user of the first user device 1, the first user inputs the input information in an input box of a screen, wherein the input box is a preview box, which is available for real-time preview by the first user. The input information may include one or more lines of information in the input box.

Preferably, the input information includes at least one of the following items: text information (including Chinese, English, and other languages, and fonts of various styles and colors), expression/symbol information (for example, emoji, etc.), call information (for example, @ other persons), picture information (for example, a QR code, etc.), and geographical location information.

A line display width of the input box is fixed, and a total display width of information in the current input line (for example, a line in which a cursor is located) is less than or equal to a line display width of the input box. In the case of that the total display width of information in the current input box does not exceed the line display width of the input box, the information in the current input line is displayed in a corresponding biggest available font. For example, in FIG. 3, a total display width of "妈妈说 (Mom says)" in a first line in an input box is less than or equal to the line display width of the input box, and a font size is a biggest available font corresponding to the first line. In a specific embodiment, a line is a control, and a size of a control is directly adjusted after an appropriate font size of a current input line is calculated. Inability to type Chinese characters (including all languages of characters typewritten by inputting Romaji) in pinyin caused by separately editing a character on a control under some input methods (such as an input method of the Apple operating system) may be avoided, so that the user has better input experience.

The information in the input box consists of the input information of each line in the input box. When the first user completes information editing and performs the information sending operation, the first user device 1 sends the information in the input box to the second user device 2 via the network device 3, and the second user device 2 displays the information in the input box. The network device 3 may store the information in the input box for big data computation and understanding user habits, so as to provide better services for the user.

Preferably, the second apparatus 12 displays the information in the current input line in a corresponding biggest available font according to an amount of information in the current input line, wherein the total display width of the information in the current input line is less than or equal to the line display width of the input box. The biggest available font decreases with an increase of the amount of information in the current input line or increases with a decrease of the amount of information in the current input line.

For example, in the case of that the total display width of the information in the current input line does not exceed the line display width of the input box, the biggest available font decreases with the increase of the amount of information in the current input line or increases with the decrease of the amount of information in the current input line.

Preferably, the second apparatus 12 determines the biggest available font corresponding to the current input line from a plurality of candidate fonts according to the amount of information in the current input line, and displays the information in the current input line according to the biggest available font corresponding to the current input line, wherein the total display width of the information in the current input line is less than or equal to the line display width of the input box.

For example, in FIG. 3, an amount of information of "妈妈说 (Mom Says)" in the first line of the input box is 3. It is assumed that a plurality of candidate fonts include twenty fonts such as 1 point font, 2 point font, 3 point font, . . . , and 20 point font whose sizes increase progressively. If a 15 point font is selected, the total display width of "妈妈说 (Mom Says)" is less than or equal to the line display width of the input box. If a 16 point font is selected, the total display width of "妈妈说 (Mom Says)" is larger than the line display width of the input box. In this case, the 15 point font is determined as the biggest available font corresponding to the current input line, and the information in the current input line is displayed in the 15 point font for preview by the first user.

Preferably, the second apparatus 12 iteratively searches for a biggest available font corresponding to the current input line from the plurality of candidate fonts, and displays information in the current input line in the biggest available font corresponding to the current input line, wherein the total display width of the information in the current input line is less than or equal to the line display width of the input box.

For example, carrying on with the example above, it is assumed that the plurality of candidate fonts include twenty fonts such as 1 point font, 2 point font, 3 point font, . . . , and 20 point font whose sizes increase progressively. The manner of iteratively searching includes: if the 10 point font is available, checking whether the 11 point font is available; if the 11 point font is not available, determining the 10 point font as the biggest available font corresponding to the current input line; or if the 11 point font is available, continuing to check whether the 12 point font is available until the biggest available font corresponding to the current input line is determined. On the basis that the total display width of the information in the current input line is less than or equal to the line display width of the input box, it is determined whether the candidate fonts are available.

More preferably, the iteratively searching for the biggest available font corresponding to the current input line from the plurality of candidate fonts includes: when the amount of information in the current input line is increased, iteratively searching, based on an original display font of the current input line, for the biggest available font corresponding to the current input line from the plurality of candidate fonts in descending order; or when the amount of information in the current input line is decreased, iteratively searching, based on an original display font of the current input line, for the biggest available font corresponding to the current input line from the plurality of candidate fonts in ascending order.

For example, carrying on with the example above, it is assumed that the plurality of candidate fonts include twenty fonts such as 1 point font, 2 point font, 3 point font, . . . , and 20 point font whose sizes increase progressively. It is assumed that the original display font is the 10 point font, and when the first user adds the input information in the current input line, that is, when the amount of information in the current input line is increased, iterative searching is performed in descending order of 10 point, 9 point, 8 point, and so on, until the biggest available font corresponding to the current input line is determined. When the first user decreases the input information in the current input line, that is, when the amount of information in the current input line is decreased, iterative searching is performed in ascending order of 10 point, 11 point, 12 point, and so on, until the biggest available font corresponding to the current input line is determined.

Preferably, the first user device 1 further includes a fourth apparatus (not shown) and a fifth apparatus (not shown). The fourth apparatus acquires a line operation of the first user in the input box, and the fifth apparatus displays information in an input line related to the line operation in a corresponding biggest available font, wherein a total display width of the information in the input line related to the line operation is less than or equal to a line display width of the input box.

Herein, the line operation includes at least one of the following: a line deletion operation (for example, the first user clicks a "delete" button when a cursor is at the beginning position of a line); and a line feed operation (for example, the first user clicks a "line feed" button).

Preferably, the line operation includes a line deletion operation. The fifth apparatus displays information in a first input line corresponding to the line deletion operation in a corresponding biggest available font, wherein a total display width of the information in the first input line is less than or equal to a line display width of the input box, and the first input line is acquired through combination of two input lines involved in the line deletion operation.

For example, when the first user device 1 detects the line deletion operation of the first user, if the cursor is at the beginning position of the $n^{th}$ (n>1) line, input information in the $n^{th}$ line to a last line is moved to a previous line of each line. The cursor is moved to an end of the $(n-1)^{th}$ line to which the content (that is, the information in the first input line corresponding to the line deletion operation) of the $n^{th}$ line is concatenated, and the last line is deleted. Wherein a corresponding biggest available font is determined according to an amount of information of the $n^{th}$ line after the line deletion operation.

Preferably, the line operation includes a line feed operation. The fifth apparatus displays information in a second input line corresponding to the line feed operation in a corresponding biggest available font, wherein a total display width of the information in the second input line is less than or equal to a line display width of the input box, and the second input line including at least one of two input lines acquired by splitting an original input line via the line feed operation.

For example, when the first user device 1 detects the line feed operation of the first user, if the cursor is at the $n^{th}$ line, a blank line is added under the $n^{th}$ line, and then content of the current $n^{th}$ line after the cursor to content of a last line before the added blank line are moved to next line thereof. The cursor is moved to a beginning position of the $(n+1)^{th}$ line. The second input line includes at least one of the $n^{th}$ line and the $(n+1)^{th}$ line, and corresponding biggest available fonts are respectively determined according to an amount of information of the $n^{th}$ line and the $(n+1)^{th}$ line after the line feed operation.

Preferably, the third apparatus 13 sends, when acquiring the information sending operation of the first user, information in the input box and a biggest available font of each line to a corresponding receiver via a network device 3. The sixth apparatus 36 receives the information in the input box and the biggest available font of each line sent by the first user device 1, and the seventh apparatus 37 sends the information in the input box and the biggest available font of each line to the corresponding receiver. The eighth apparatus 28 receives information in an input box and the biggest available font of each line sent by a network device, and the ninth apparatus 29 displays the information in the input box according to the biggest available font of each line in the input box.

For example, the information in the input box consists of input information of each line in the input box. When the first user completes editing information and performs the information sending operation, the first user device 1 sends the information in the input box and the biggest available font of each line to the second user device 2 via the network device 3, and the second user device 2 displays the information in the input box according to the biggest available font of each line. In this way, the second user device 2 as the receiver displays a font size of the information in the input box to remain consistent with the first user device 1 as the sender.

Preferably, the ninth apparatus 29 generates corresponding picture information according to the information in the input box and the biggest available font of each line, and displays the picture information.

In a specific embodiment, the first user device 1 assembles the information in the input box and the biggest available font of each line in a certain format (including but not limited to JSON, XML, etc.). For example, a JSON format is: {"text":["This is the first line", "This is the second line"],"color":"#000000","font":"Helvetica"}, and an XML format is: <text color="#000000" font="Helvetica"><line>This is the first line</line><line>This is the second line</line></text>. Next, the first user device 1 sends the assembled data to the second user device 2 via the network device 3. The second user device 2 parses the assembled data according to a same rule after receiving the assembled data, draws corresponding picture information in local, and then displays the picture information. The second user device 2 may correspondingly draw the picture information corresponding to the information in the input box and the biggest available font of each line according to resolution of a screen thereof, so that the picture information is more suitable for view on the second user device 2. For example, the information in the input box and the biggest available font of each line may be assembled in a certain format (including but not limited to JSON, XML, etc.) through a specific application (APP) on the first user device 1, and then the assembled data is parsed and corresponding picture information is generated through a specific application (APP) on the second user device 2.

Preferably, the third apparatus 13, generates, when acquiring the information sending operation of the first user, corresponding picture information according to the information in the input box and the biggest available font of each line, and sends the picture information to the corresponding receiver via the network device 3. The eighth apparatus 28 receives the picture information corresponding to the information in the input box and the biggest available font of each line sent by the network device, and the ninth apparatus 29 displays the picture information corresponding to the information in the input box and the biggest available font of each line.

For example, the first user device 1 may create a new control, draw the information in the input box onto the control according to the biggest available font of each line, and take a screenshot of the control to acquire corresponding picture information. Next, the first user device 1 sends the picture information to the second user device 2 via the network device 3. The second user device 2 receives and displays the picture information. The first user device 1 may appropriately increase a compression ratio when sending the picture information, thereby reducing a picture size and saving user traffic.

Preferably, the seventh apparatus 37 generates corresponding picture information according to the information in the input box and the biggest available font of each line, and sends the picture information to a corresponding receiver. The eighth apparatus 28 receives the picture information corresponding to the information in the input box and the biggest available font of each line sent by the network device, and the ninth apparatus 29 displays the picture information corresponding to the information in the input box and the biggest available font of each line.

In a specific embodiment, the first user device 1 assembles the information in the input box and the biggest available font of each line in a certain format (including but not limited to JSON, XML, etc.). For example, a JSON format is: {"text":["This is the first line", "This is the second line"],"color": "#000000", "font": "Helvetica"}, and an XML format is:<text color="#000000" font="Helvetica"><line>This is the first line</line><line>This is the second line</line></text>. Next, the first user device 1 sends the assembled data to the network device 3. The network device 3 parses the assembled data according to a same rule after receiving the assembled data, draws corresponding picture information, and then sends the picture information to the second user device 2. The second user device 2 receives and displays the picture information.

According to yet another aspect of the present application, a system for transmitting information is provided, wherein the system including the foregoing first user device 1, the foregoing network device 3, and the foregoing second user device 2.

Figure 4:
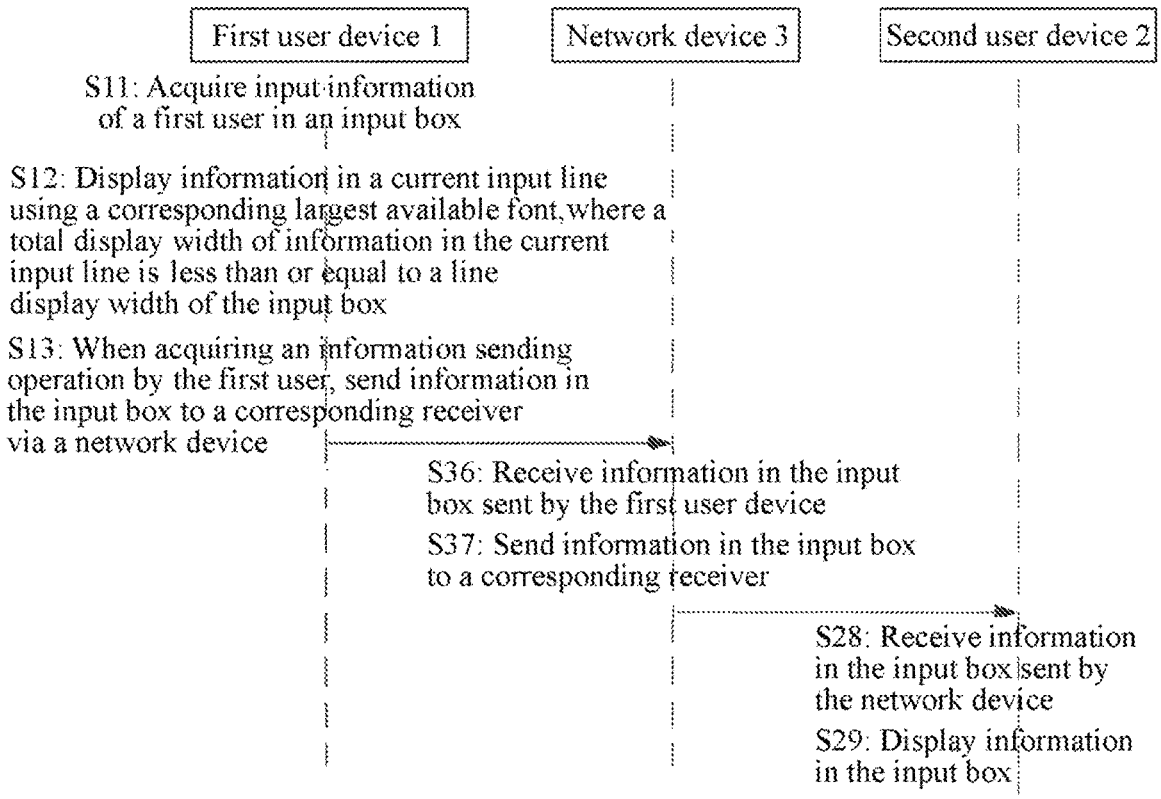
FIG. 4 is flowchart of a method for transmitting information according to another embodiment of the present application.

FIG. 4 shows a flowchart of a method for transmitting information according to another embodiment of the present application, the method including step S11, step S12, and step S13 of the first user device side, step S36 and step S37 of the network device side, and step S28 and step S29 of the second user device side.

Specifically, in step S11, the first user device 1 acquires input information of the first user in an input box. In step S12, the first use device 1 displays information in a current input line in a corresponding biggest available font, wherein a total display width of information in the current input line is less than or equal to a line display width of the input box. In step S13, the first user device 1 sends, when acquiring an information sending operation of the first user, the information in the input box to a corresponding receiver through the network device 3. In step 36, the network device 3 receives the information in the input box sent by the first user device 1. In step S37, the network device 3 sends the information in the input box to the corresponding receiver. In step S28, a second user device 2 receives the information in the input box sent by the network device 3. In step S29, the second user device 2 displays the information in the input box.

Herein, the first user device 1 is a sender of information, and the second user device 2 is a receiver of information. The network device 3 transits and transmits information between the first user device 1 and the second user device 2.

For example, referring to FIG. 3, as a user of the first user device 1, the first user inputs the input information in an input box of a screen, wherein the input box is a preview box, which is available for real-time preview by the first user. The input information may include one or more lines of information in the input box.

Preferably, the input information includes at least one of the following items: text information (including Chinese, English, and other languages, and fonts of various styles and colors), expression/symbol information (for example, emoji, etc.), call information (for example, @ other persons), picture information (for example, a QR code, etc.), and geographical location information.

A line display width of the input box is fixed, and a total display width of information in the current input line (for example, a line in which a cursor is located) is less than or equal to a line display width of the input box. In the case of that the total display width of information in the current input box does not exceed the line display width of the input box, the information in the current input line is displayed in a corresponding biggest available font. For example, in FIG. 3, a total display width of "妈妈说 (Mom says)" in a first line in an input box is less than or equal to the line display width of the input box, and a font size is a biggest available font corresponding to the first line. In a specific embodiment, a line is a control, and a size of a control is directly adjusted after an appropriate font size of a current input line is calculated. Inability to type Chinese characters (including all languages of characters typewritten by inputting Romaji) in pinyin caused by separately editing a character on a control under some input methods (such as an input method of the Apple operating system) may be avoided, so that the user has better input experience.

The information in the input box consists of the input information of each line in the input box. When the first user completes information editing and performs the information sending operation, the first user device 1 sends the information in the input box to the second user device 2 via the network device 3, and the second user device 2 displays the information in the input box. The network device 3 may store the information in the input box for big data computation and understanding user habits, so as to provide better services for the user.

Preferably, in step S12, the first user device 1 displays the information in the current input line in a corresponding biggest available font according to the amount of information in the current input line, wherein the total display width of the information in the current input line is less than or equal to the line display width of the input box, and the biggest available font decreasing with an increase of the amount of information in the current input line or increasing with an decrease of the amount of information in the current input line.

For example, in the case of that the total display width of the information in the current input line does not exceed the line display width of the input box, the biggest available font decreases with the increase of the amount of information in the current input line or increases with the decrease of the amount of information in the current input line.

Preferably, in step S12, the first user device 1 determines the biggest available font corresponding to the current input line from a plurality of candidate fonts according to the amount of information in the current input line, and displays the information in the current input line according to the biggest available font corresponding to the current input line, wherein the total display width of the information in the current input line is less than or equal to the line display width of the input box.

For example, in FIG. 3, an amount of information of "妈妈说 (Mom Says)" in the first line of the input box is 3. It is assumed that a plurality of candidate fonts include twenty fonts such as 1 point font, 2 point font, 3 point font, ..., and 20 point font whose sizes increase progressively. If a 15 point font is selected, the total display width of "妈妈说 (Mom Says)" is less than or equal to the line display width of the input box. If a 16 point font is selected, the total display width of "妈妈说 (Mom Says)" is larger than the line display width of the input box. In this case, the 15 point font is determined as the biggest available font corresponding to the current input line, and the information in the current input line is displayed in the 15 point font for preview by the first user.

Preferably, in step S12, the first user device 1 iteratively searches for a biggest available font corresponding to the current input line from the plurality of candidate fonts, and displays information in the current input line with a biggest available font corresponding to the current input line, wherein the total display width of the information in the current input line is less than or equal to the line display width of the input box.

For example, following the above example, it is assumed that the plurality of candidate fonts include twenty fonts such as 1 point font, 2 point font, 3 point font, ..., and 20 point font whose sizes increase progressively. The manner of iteratively searching includes: if the 10 point font is available, checking whether the 11 point font is available; if the 11 point font is not available, determining the 10 point font as the biggest available font corresponding to the current input line; or if the 11 point font is available, continuing to check whether the 12 point font is available until the biggest available font corresponding to the current input line is determined. On the basis that the total display width of the information in the current input line is less than or equal to the line display width of the input box, it is determined whether the candidate fonts are available.

More preferably, the iteratively searching for the biggest available font corresponding to the current input line from the plurality of candidate fonts includes: when the amount of information in the current input line is increased, iteratively searching, based on an original display font of the current input line, for the biggest available font corresponding to the current input line from the plurality of candidate fonts in descending order; or when the amount of information in the current input line is decreased, iteratively searching, based on an original display font of the current input line, for the biggest available font corresponding to the current input line from the plurality of candidate fonts in ascending order.

For example, following the above example, it is assumed that the plurality of candidate fonts include twenty fonts such as 1 point font, 2 point font, 3 point font, ..., and 20 point font whose sizes increase progressively. It is assumed that the original display font is the 10 point font, and when the first user adds the input information in the current input line, that is, when the amount of information in the current input line is increased, iterative searching is performed in descending order of 10 point, 9 point, 8 point, and so on, until the biggest available font corresponding to the current input line is determined. When the first user decreases the input information in the current input line, that is, when the amount of information in the current input line is decreased, iterative searching is performed in ascending order of 10 point, 11 point, 12 point, and so on, until the biggest available font corresponding to the current input line is determined.

Preferably, the method further includes: the first user device 1 acquiring a line operation of the first user in the input box, and displaying information in an input line related to the line operation in a corresponding biggest available font, wherein a total display width of the information in the input line related to the line operation is less than or equal to the line display width of the input box.

Herein, the line operation includes at least one of the following: a line deletion operation (for example, the first user clicks a "delete" button when a cursor is at the beginning position of a line); and a line feed operation (for example, the first user clicks a "line feed" button).

Preferably, the line operation includes a line deletion operation. The first user device 1 displays information in a first input line corresponding to the line deletion operation using a corresponding biggest available font, wherein a total display width of the information in the first input line is less than or equal to a line display width of the input box, and the first input line is acquired through combination of two input lines related to the line deletion operation.

For example, when the first user device 1 detects the line deletion operation of the first user, if the cursor is at the beginning position of the $n^{th}$ (n>1) line, input information in the $n^{th}$ line to a last line is moved to a previous line of each line. The cursor is moved to an end of the $(n-1)^{th}$ line to which the content (that is, the information in the first input line corresponding to the line deletion operation) of the $n^{th}$ line is concatenated, and the last line is deleted. Wherein a corresponding biggest available font is determined according to an amount of information of the $n^{th}$ line after the line deletion operation.

Preferably, the line operation includes a line feed operation. The first user device 1 displays information in a second input line corresponding to the line feed operation using a corresponding biggest available font, wherein a total display width of the information in the second input line is less than or equal to the line display width of the input box, and the second input line including at least one of two input lines acquired by partition of an original input line through the line feed.

For example, when the first user device 1 detects the line feed operation of the first user, if the cursor is at the $n^{th}$ line, a blank line is added under the $n^{th}$ line, and then content of the current $n^{th}$ line after the cursor to content of a last line before the added blank line are moved to next line thereof. The cursor is moved to a beginning position of the $(n+1)^{th}$ line. The second input line includes at least one of the $n^{th}$ line and the $(n+1)^{th}$ line, and corresponding biggest available fonts are respectively determined according to an amount of information of the $n^{th}$ line and the $(n+1)^{th}$ line after the line feed operation.

Preferably, in step S13, the first user device 1, when acquiring the information sending operation of the first user, sends information in the input box and a biggest available font of each line to a corresponding receiver via a network device 3. In step S36, the network device 3 receives the information in the input box and the biggest available font of each line sent by the first user device 1. In step S37, the network device 3 sends the information in the input box and the biggest available font of each line to a corresponding receiver. In step S28, the second user device 2 receives the information in the input box and the biggest available font of each line sent by a network device. In step S29, the second user device 2 displays the information in the input box according to the biggest available font of each line in the input box.

For example, the information in the input box consists of input information of each line in the input box. When the first user completes editing information and performs the information sending operation, the first user device 1 sends the information in the input box and the biggest available font of each line to the second user device 2 via the network device 3, and the second user device 2 displays the information in the input box according to the biggest available font of each line. In this way, the second user device 2 as the receiver displays a font size of the information in the input box to remain consistent with the first user device 1 as the sender.

Preferably, in step S29, the second user device 2 generates corresponding picture information and displays the picture information according to the information in the input box and the biggest available font of each line.

In a specific embodiment, the first user device 1 assembles the information in the input box and the biggest available font of each line in a certain format (including but not limited to JSON, XML, etc.). For example, a JSON format is: {"text":["This is the first line","This is the second line"], "color": "#000000", "font": "Helvetica"}, and an XML format is:<text color="#000000" font="Helvetica"><line>This is the first line</line><line>This is the second line</line></text>. Next, the first user device 1 sends the assembled data to the second user device 2 via the network device 3. The second user device 2 parses the assembled data according to a same rule after receiving the assembled data, draws corresponding picture information in local, and then displays the picture information. The second user device 2 may correspondingly draw the picture information corresponding to the information in the input box and the biggest available font of each line according to resolution of a screen thereof, so that the picture information is more suitable for view on the second user device 2. For example, the information in the input box and the biggest available font of each line may be assembled in a certain format (including but not limited to JSON, XML, etc.) through a specific application (APP) on the first user device 1, and then the assembled data is parsed and corresponding picture information is generated through the specific application (APP) on the second user device 2.

Preferably, in step S13, a first user device 1, generates, when acquiring an information sending operation of the first user, corresponding picture information according to the information in the input box and a biggest available font of each line; and sends the picture information to a corresponding receiver via the network device 3. In step S28, a second user device 2 receives the picture information corresponding to the information in the input box and the biggest available font of each line sent by a network device. In step S29, the second user device 2 displays the picture information corresponding to the information in the input box and the biggest available font of each line.

For example, the first user device 1 may create a new control, draw the information in the input box onto the control according to the biggest available font of each line, and take a screenshot of the control to acquire corresponding picture information. Next, the first user device 1 sends the picture information to the second user device 2 via the network device 3. The second user device 2 receives and displays the picture information. The first user device 1 may appropriately increase a compression ratio when sending the picture information, thereby reducing a picture size and saving user traffic.

Preferably, in step S37, the network device 3 generates corresponding picture information according to the information in the input box and the biggest available font of each line, and sends the picture information to a corresponding receiver. In step S28, the second user device 2 receives picture information corresponding to the information in the input box and the biggest available font of each line sent by a network device. In step S29, the second user device 2 displays the picture information corresponding to the information in the input box and the biggest available font of each line.

In a specific embodiment, the first user device 1 assembles the information in the input box and the biggest available font of each line in a certain format (including but not limited to JSON, XML, etc.). For example, a JSON format is: {"text":["This is the first line", "This is the second line"],"color": "#000000", "font": "Helvetica"}, and an XML format is:<text color="#000000" font="Helvetica"><line>This is the first line</line><line>This is the second line</line></text>. Next, the first user device 1 sends the assembled data to the network device 3. The network device 3 parses the assembled data according to a same rule after receiving the assembled data, draws corresponding picture information, and then sends the picture information to the second user device 2. The second user device 2 receives and displays the picture information.

According to still another aspect of the present application, a method for transmitting information is provided, the method including:

acquiring, by a first user device, input information of a first user in an input box;

displaying, by the first user device, information in a current input line in a corresponding biggest available font, wherein a total display width of the information in the current input line is less than or equal to a line display width of the input box;

sending, by the first user device when acquiring an information sending operation of the first user, information in the input box to a network device;

receiving, by the network device, the information in the input box sent by the first user device;

sending, by the network device, the information in the input box to a corresponding second user device;

receiving, by the second user device, the information in the input box sent by the network device; and displaying, by the second user device, the information in the input box.

According to still another aspect of the present application, a method for transmitting information is provided, the method including:

acquiring, by a first user device, input information of a first user in an input box;

displaying, by the first user device, information in a current input line in a corresponding biggest available font, wherein a total display width of the information in the current input line is less than or equal to a line display width of the input box;

generating, by the first user device when acquiring an information sending operation of the first user, corresponding picture information according to the information in the input box and the biggest available font of each line, and sending the picture information to a network device;

receiving, by the network device, the picture information sent by the first user device, and sending the picture information to a corresponding second user device; and receiving, by the second user device, the picture information sent by the network device, and displaying the picture information.

According to still another aspect of the present application, a method for transmitting information is provided, the method including:

acquiring, by a first user device, input information of a first user in an input box;

displaying, by the first user device, information in a current input line in a corresponding biggest available font, wherein a total display width of the information in the current input line is less than or equal to a line display width of the input box;

sending, by the first user device when acquiring an information sending operation of the first user, information in the input box and a biggest available font of each line to a network device;

receiving, by the network device, the information in the input box sent by the first user device and the biggest available font of each line;

generating, by the user device, corresponding picture information according to the information in the input box and the biggest available font of each line, and sending the picture information to a corresponding second network device; and receiving, by the second user device, the picture information sent by the network device, and displaying the picture information.

According to still another aspect of the present application, a method for transmitting information is provided, the method including:

acquiring, by a first user device, input information of a first user in an input box;

displaying, by the first user device, information in a current input line in a corresponding biggest available font, wherein a total display width of the information in the current input line is less than or equal to a line display width of the input box;

sending, by the first user device when acquiring an information sending operation of the first user, information in the input box and a biggest available font of each line to a network device;

receiving, by the network device, the information in the input box and a biggest available font of each line sent by the first user device, and sending the information in the input box and the biggest available font of each line to a corresponding second user device;

receiving, by the second network device, the information in the input box and the biggest available font of each line sent by the network device; and generating, by the second user device, corresponding picture information according to the information in the input box and the biggest available font of each line, and displaying the picture information.

Figure 5:
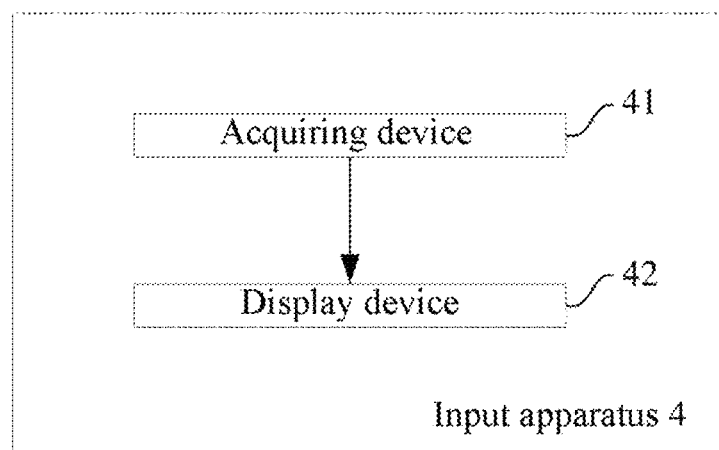
FIG. 5 is a schematic diagram of an input device according to still another embodiment of the present application.

FIG. 5 shows an input device 4 according to still another embodiment of the present application, the input device 4 including an acquiring apparatus 41 and a display apparatus 42.

Specifically, the acquiring apparatus 41 acquires input information of a user in an input box, and the display apparatus 42 displays information in a current input line in a corresponding biggest available font, wherein a total display width of the information in the current input line is less than or equal to a line display width of the input box.

Herein, the input device 4 includes, but is not limited to, any mobile electronic product that can perform human-computer interaction with the user, such as a smart phone, a tablet computer, and a notebook computer, etc. The mobile electronic product may use any operating system, such as an android operating system, an iOS operating system, or a Windows operating system, etc.

For example, the user inputs the input information (the input information may include one or more lines of information in the input box) in an input box of a screen of the input device 4, wherein the input box is a preview box, which is available for real-time preview by the user. The input information includes at least one of the following items: text information (including Chinese, English, and other languages, and fonts of various styles and colors), expression/symbol information (for example, emoji, etc.), call information (for example, @ other persons), picture information (for example, a QR code, etc.), and geographical location information. A line display width of the input box is fixed, and a total display width of information in the current input line (for example, a line in which a cursor is located) is less than or equal to a line display width of the input box. In the case of that the total display width of information in the current input box does not exceed the line display width of the input box, the information in the current input line is displayed in a corresponding biggest available font. For example, in FIG. 3, a total display width of "妈妈 说 (Mom says)" in a first line in an input box is less than or equal to the line display width of the input box, and a font size is a biggest available font corresponding to the first line. In a specific embodiment, a line is a control, and a size of a control is directly adjusted after an appropriate font size of a current input line is calculated. Inability to type Chinese characters (including all languages of characters typewritten by inputting Romaji) in pinyin caused by separately editing a character on a control under some input methods (such as an input method of the Apple operating system) may be avoided, so that the user has better input experience.

Figure 6:
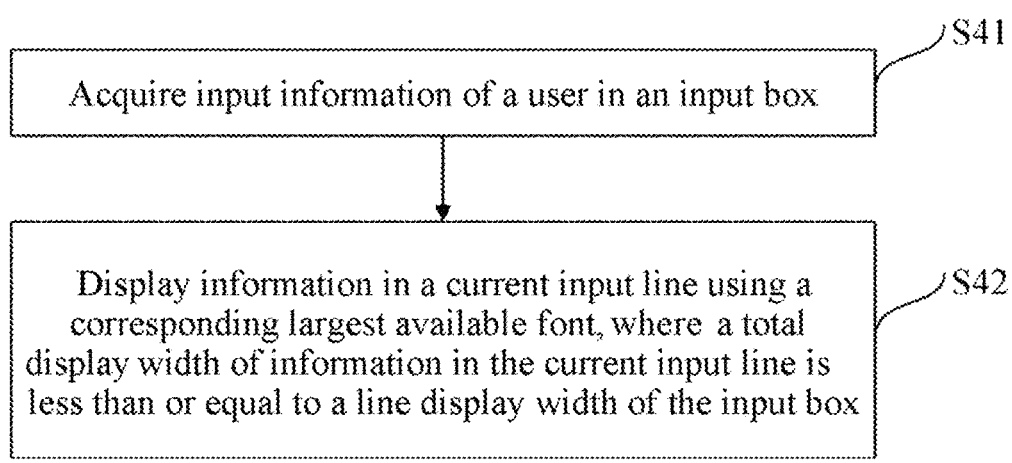
FIG. 6 is a flowchart of an input method according to still another embodiment of the present application.

FIG. 6 is a flowchart of an input method according to still another embodiment of the present application, the method including step S41 and step S42.

Specifically, in step S41, an input device 4 acquires input information of a user in an input box. In step S42, the input device 4 displays information in a current input line in a corresponding biggest available font, wherein a total display width of the information in the current input line is less than or equal to a line display width of the input box.

Herein, the input device 4 includes, but is not limited to, any mobile electronic product that can perform human-computer interaction with the user, such as a smart phone, a tablet computer, and a notebook computer, etc. The mobile electronic product may use any operating system, such as an android operating system, an iOS operating system, or a Windows operating system, etc.

For example, the user inputs the input information (the input information may include one or more lines of information in the input box) in an input box of a screen of the input device 4, wherein the input box is a preview box, which is available for real-time preview by the user. The input information includes at least any of the following items: text information (including languages such as Chinese, English, and other languages, and fonts of various styles and colors), expression/symbol information (for example, emoji, etc.), call information (for example, @other persons), picture information (for example, a QR code, etc.), and geographical location information. A line display width of the input box is fixed, and a total display width of information in the current input line (for example, a line in which a cursor is located) is less than or equal to a line display width of the input box. In the case of that the total display width of information in the current input box does not exceed the line display width of the input box, the information in the current input line is displayed in a corresponding biggest available font. For example, in FIG. 3, a total display width of "妈妈说 (Mom says)" in a first line in an input box is less than or equal to the line display width of the input box, and a font size is a biggest available font corresponding to the first line. In a specific embodiment, a line is a control, and a size of a control is directly adjusted after an appropriate font size of a current input line is calculated. Inability to type Chinese characters (including all languages of characters typewritten by inputting Romaji) in pinyin caused by separately editing a character on a control under some input methods (such as an input method of the Apple operating system) may be avoided, so that the user has better input experience.

According to still another aspect of the present application, there is provided a computer readable storage medium including instructions which, when executed, cause a system to perform the following operations:

acquiring input information of a first user in an input box;

displaying information in a current input line in a corresponding biggest available font, wherein a total display width of the information in the current input line is less than or equal to a line display width of the input box; and sending, when acquiring an information sending operation of the first user, information in the input box to a corresponding receiver via a network device.

According to still another aspect of the present application, there is provided a computer readable storage medium including instructions which, when executed, cause a system to perform the following operations:

receiving information in an input box sent by a first user device; and sending the information in the input box to a corresponding receiver.

According to still another aspect of the present application, there is provided a computer readable storage medium including instructions which, when executed, cause a system to perform the following operations:

receiving information in an input box sent by a network device; and displaying the information in the input box.

According to still another aspect of the present application, a first user device for transmitting information is provided, the first user device including:

a processor; and a memory configured to store computer executable instructions which, when executed, cause the processor to:

acquire input information of a first user in an input box;

display information in a current input line in a corresponding biggest available font, wherein a total display width of the information in the current input line is less than or equal to a line display width of the input box; and send, when acquiring an information sending operation of the first user, information in the input box to a corresponding receiver via a network device.

According to still another aspect of the present application, a network device for transmitting information is provided, the network device including:

a processor; and a memory configured to store computer executable instructions which, when executed, cause the processor to:

receive information in an input box sent by a first user device; and send the information in the input box to a corresponding receiver.

According to still another aspect of the present application, a second user device for transmitting information is provided, the second user device including:

a processor; and a memory configured to store computer executable instructions which, when executed, cause the processor to:

receive information in an input box sent by a network device; and display the information in the input box.

In comparison to the prior art, a first user device of the present application acquires input information of a first user in an input box, displays information in a current input line in a corresponding biggest available font on the basis that a total display width of the information in the current input line is less than or equal to a line display width of the input box, and sends, when acquiring an information sending operation of the first user, the information in the input box to a network device. The network device receives the information in the input box sent by the first user device and sends the information in the input box to a corresponding second user device, and the second user device receives the information in the input box sent by the network device and displays the information in the input box. In the present application, a layout operation is performed in the corresponding biggest available font on the basis that the total display width of the information in the current input line is less than or equal to the line display width of the input box. The input box is a preview box for real-time preview by the first user, providing a user-friendly chat interface, increasing enjoyment of user chat, and optimizing user experience.

Further, the present application provides a plurality of manners for generating picture information corresponding to the information in the input box and a biggest available font of each line. For example, a first user device may generate the picture information, and then sends the picture information to a second user device via a network device. In such manner, a client of a low version may be compatible. Alternatively, a second user device may generate corresponding picture information according to the received information in the input box and the biggest available font of each line. In such manner, user traffic may be saved and the generated picture information is more suitable for view on the second user device. In addition, the network device may generate corresponding picture information according to the information in the input box and the biggest available font of each line sent by the first user device, and then sends the picture information to the second user device.

It should be noted that, the present application may be implemented in software and/or a combination of software and hardware, for example, may be implemented by using an application-specific integrated circuit(ASIC), a general purpose computer, or any other similar hardware device. In an embodiment, the software program in the present application may be executed by using a processor to implement the foregoing steps or functions. Similarly, a software program (including a related data structure) in the present application may be stored in a computer-readable recording medium such as a RAM, a magnetic or optical drive, a floppy disk, or other similar device. In addition, some steps or functions of the present application may be implemented by using hardware, for example, a circuit that is used in combination with a processor to perform various steps or functions.

In addition, some of the present application may be applied to a computer program product, for example, a computer program instruction. When the computer program instruction is executed by a computer, the computer is caused to operate to invoke or provide the method and/or the technical solution according to the present application. A program instruction for calling the method of the present application may be stored in a fixed or removable recording medium, and/or transmitted via a data stream in a broadcast or other signal bearing medium, and/or stored in a working memory of a computer device that runs according to the program instruction. Herein, an embodiment according to the present application includes an apparatus. The apparatus includes a memory configured to store a computer program instruction and a processor configured to execute the program instruction. When the computer program instruction is executed by the processor, the apparatus is triggered to run the method and/or the technical solution according to the embodiments of the present application.

It is apparent to a person skilled in the art that the present application is not limited to details in the foregoing exemplary embodiments, and the present application can be implemented in another specific form without departing from the spirit or basic features of the present application. Therefore, the embodiments should be considered to be exemplary in all respects and not limitative. The scope of the present application is not defined by the foregoing description but by the appended claims. The present application is intended to include all the variations that are equivalent in significance and scope to the claims. No reference numerals in the claims should be considered as limitations in the related claims. In addition, the term "include" apparently does not exclude other units or steps, and a singular form does not exclude a plural form. Multiple units or apparatuses recited in an apparatus claim may also be implemented by one unit or apparatus through software or hardware. Terms such as "first" and "second" are used to indicate names, but do not indicate any particular sequence.

What is claimed is:

1. A method for transmitting information at a first user device side, the method comprising:
   acquiring input information of a first user in an input box, wherein a line display width of the input box is fixed, the input information includes input information of multiple lines in the input box, and a line is a control;
   determining, according to an amount of information in a current input line, the biggest available font corresponding to the current input line from a plurality of candidate fonts; adjusting, after calculating an appropriate font size of the current input line, a size of the control directly;
   displaying the information in a current input line in a corresponding biggest available font, wherein a total display width of the information in the current input line is less than or equal to a line display width of the input box; and
   acquiring input information of a receiver by a network device;
   sending, when acquiring information sending operation of the first user, the information in the input box and the input information of the first user device to the corresponding receiver by the network device, wherein the input information of the first user device is parsed using a rule and the input information is parsed by the network device using the rule;
   generating, by the network device, picture information based on the input information of the receiver corresponding to the biggest available font of each line of the information in the input box of the first user device for the receiver; and
   sending, by the network device, the picture information to the receiver.

2. The method according to claim 1, wherein the step of displaying the information in the current input line in the corresponding biggest available font, comprises:
   displaying the information in the current input line in the corresponding biggest available font according to the amount of information in the current input line, wherein the biggest available font decreases with an increase of the amount of information in the current input line or increases with a decrease of the amount of information in the current input line.

3. The method according to claim 1, wherein the step of displaying the information in the current input line in the corresponding biggest available font, wherein the total display width of the information in the current input line is less than or equal to the line display width of the input box comprises:
   iteratively searching for the biggest available font corresponding to the current input line from a plurality of candidate fonts; and
   displaying the information in the current input line according to the biggest available font corresponding to the current input line.

4. The method according to claim 3, wherein the step of iteratively searching for the biggest available font corresponding to the current input line from the plurality of candidate fonts comprises:
   iteratively searching, based on an original display font of the current input line, for the biggest available font corresponding to the current input line from the plurality of candidate fonts in a descending order when an amount of information in the current input line is increased; or
   iteratively searching, based on an original display font of the current input line, for the biggest available font corresponding to the current input line from the plurality of candidate fonts in an ascending order when an amount of information in the current input line is decreased.

5. The method according to claim 1, wherein the step of sending, when acquiring the information sending operation of the first user, the information in the input box to the corresponding receiver via the network device, comprises:
   sending, when acquiring the information sending operation of the first user, the information in the input box and a biggest available font of each line to the corresponding receiver via the network device.

6. A method for transmitting information at a network device side, the method comprising:
  receiving information in an input box sent by a first user device; and
  sending the information in the input box to a corresponding receiver;
  wherein the step of receiving information in the input box sent by the first user device comprises:
  receiving the information in the input box and a biggest available font of each line sent by the first user device; and
  wherein the step of sending the information in the input box to the corresponding receiver, comprises:
  acquiring the input information of the receiver by the network device;
  sending the information in the input box and the input information of the first user device and the biggest available font of each line to the corresponding receiver, wherein the input information of the first user device is parsed using a rule and the input information is parsed by the network device using the rule;
  generating picture information based on the input information of the receiver corresponding to the biggest available font of each line of the information in the input box of the first user device for the receiver; and
  sending the picture information to the receiver.

7. A method for transmitting information to a second user device side, the method comprising:
  providing input information of the second user device to a network device;
  receiving, by the second user device, information in an input box of a first user device sent to a network device by the first user device;
  generating, by the network device, picture information based on the input information of the second user device corresponding to a biggest available font of each line of information in the input box of the first user device; and
  sending, by the network device, the information and the picture information to the second user device;
  displaying the information and the picture information in the input box of the second user device;
  wherein the step of receiving, by the second user device, information and the picture information in the input box of the first user device, sent by the network device, comprises:
  receiving, based on the input information of the second user device, the information in the input box of the first user device and the picture information of the biggest available font of each line for the second user device sent by the network device for the corresponding information in the input box of the first user device, wherein the input information of the first user device is parsed using a rule and the input information is parsed by the network device using the rule; and
  wherein the step of displaying the information and the picture information in the input box comprises:
  displaying the information and the picture information in the input box according to the biggest available font of each line in the input box of the second user device based on the input information of the second user device.

8. The method according to claim 7, wherein the step of receiving, based on the input information of the second user device, the information in the input box of the first user device and the picture information of the biggest available font of each line for the second user device assembled according to with a rule for parsing the format of the input information sent by the network device for the corresponding information in the input box of the first user device comprises:
  receiving picture information corresponding to the information in the input box and the biggest available font of each line sent by the first user device to the network device; and
  wherein the step of displaying the information and the picture information in the input box of the second user device according to the biggest available font of each line in the input box comprises:
  displaying the picture information based on the input information of the second user device corresponding to the information in the input box and the biggest available font of each line of the second user device.

* * * * *